Sept. 23, 1924.  1,509,499
A. W. THOMPSON ET AL
CELERY CUTTING MACHINE
Filed Nov. 27, 1922
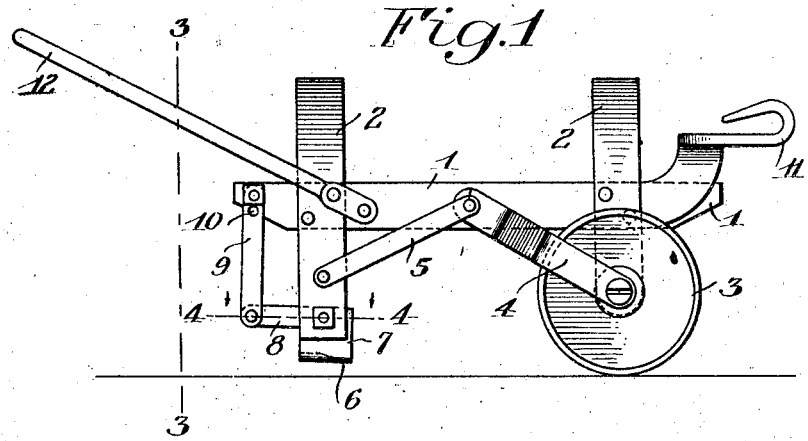
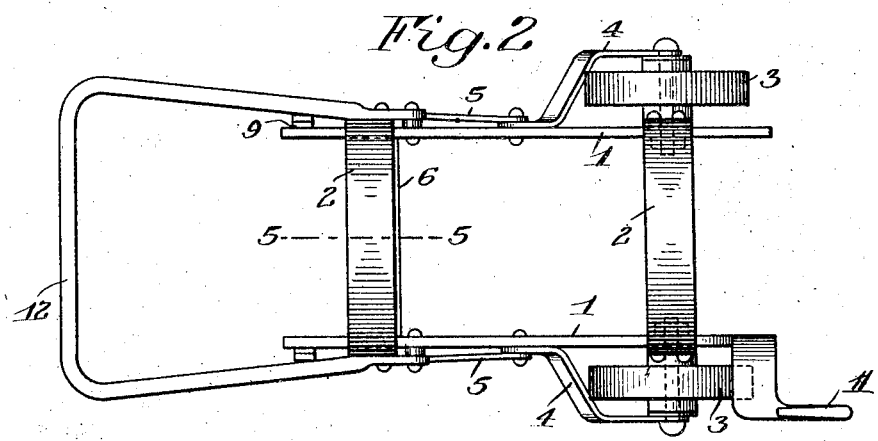
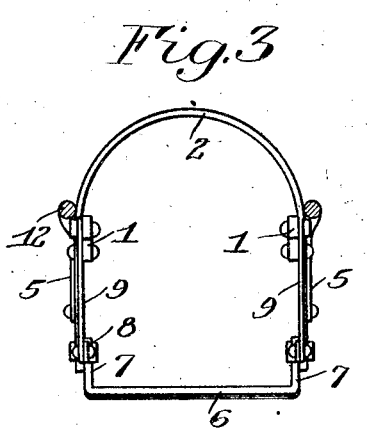
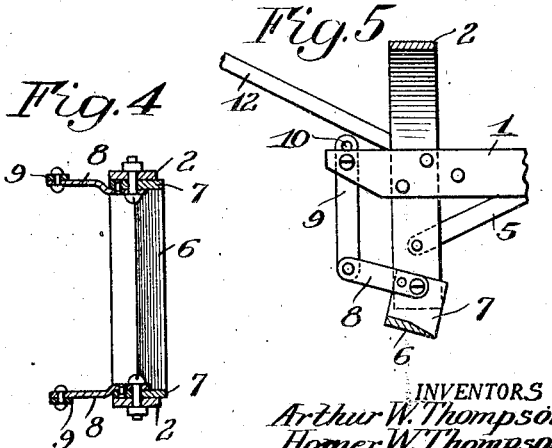
INVENTORS
Arthur W. Thompson
Homer W. Thompson
their ATTORNEY Patented Sept. 23, 1924.

1,509,499

UNITED STATES PATENT OFFICE.

ARTHUR W. THOMPSON AND HOMER W. THOMPSON, OF IRONDEQUOIT, NEW YORK.

CELERY-CUTTING MACHINE.

Application filed November 27, 1922. Serial No. 603,566.

*To all whom it may concern:*

Be it known that we, ARTHUR W. THOMPSON and HOMER W. THOMPSON, both citizens of the United States of America, residing at Irondequoit, in the county of Monroe and State of New York, have invented certain new and useful Improvements in Celery-Cutting Machines, of which the following is a specification.

This invention relates to a celery cutting machine, and has for its purpose to provide a practical, efficient and economically constructed machine adapted for cutting celery stalks from the roots.

Celery is hilled up to the leaves, and is cut at a point under the top of the hill by a knife moving horizontally through the earth forming the bottom of the hill, and it is a further purpose of the invention to afford a horse-drawn machine so arranged that a horse may travel between adjacent rows of celery while the knife is positioned for cutting one of said rows.

Still an additional object of the invention is to provide a strong, durable construction, with facilities for readily adjusting the knife in proper position for most efficient cutting, the parts being constructed and proportioned so as to enable the operator to guide the machine and hold it in proper relation to the celery plants with extreme facility.

The invention also comprehends certain other advantages and improved features, all of which will appear clearly from the following description when read in conjunction with the accompanying drawing, the novel features being pointed out in the claims following the description.

In the drawing:

Figure 1 is a side elevation of a machine constructed in accordance with a preferred embodiment of the invention;

Figure 2 is a plan view;

Figure 3 is a transverse vertical sectional view on line 3—3 of Figure 1;

Figure 4 is a horizontal sectional view on line 4—4 of Figure 1, and

Figure 5 is a longitudinal vertical sectional view on line 5—5 of Figure 2.

The construction which has been selected to illustrate the invention, and which comprises one practical way of carrying out the improvements, consists of a wheeled frame including longitudinal bars 1 and transversely arranged forward and rear arch members 2 attached to said bars and extending downwardly beneath the same. Attached to the lower ends of the forward arch member 2 are wheels 3 which support the machine, the latter being additionally held by brace rods 4 extending and attached to the longitudinal bars 1, while 5 designate brace rods attached to the rear arch member 2 and to the longitudinal bars 1.

Arranged at the bottom of the rear arch member 2, and in a horizontal position just above the ground when the machine is operating, is a knife 6, the ends 7 of which are upturned and pivotally supported upon the ends of the rear arch member 2. Rigidly connected to the ends 7 of the knife are links 8 which are pivotally connected to rods 9, and the latter are adjustably secured to the rear end of the longitudinal bars 1 by means of bolts or other suitable attaching mechanism. In order to effect angular adjustment of the knife 6 with reference to the ground, the rods 9 have a plurality of openings 10 at the top which may be selectively engaged with the longitudinal bars 1, and by thus using different openings 10 for attaching the rods 9, the angle of the knife 6 can be regulated, as shown in Figure 5, to obtain the proper angle of cut.

The device is intended to be drawn by a horse or other draft animal, and to this end, a hitching device 11 is provided at the front of the machine and at one side thereof. The hitching device 11 may be formed integral with the adjacent longitudinal bar 1, as shown, although it may also be otherwise constructed, the essential characteristic of said hitching device being that it is located at the side of the machine. The result of this arrangement is to permit the knife 6 to cut the stalks in a row of celery located between the longitudinal bars 1 and under the tops of the arch members 2, while the horse drawing the machine walks between said row just mentioned and the adjacent row.

The machine is guided by the operator through the handle 12 located at the rear of the machine and fastened to the longitudinal bars 1. The tendency to turn the machine, resulting from drawing it at one side, is effectively overcome by locating the knife a substantial distance in rear of the wheels and hitching device. By positioning the knife at the rear of the machine, and a considerable distance behind the hitching point, it exercises sufficient leverage in cutting contact with the stalks, to hold or nearly hold the machine in its proper course, and the operator has no difficulty in guiding the machine properly, by exerting but slight pressure on the handle 12.

While the invention has been disclosed with reference to a precise construction, it is not limited to the details of the mechanism described, but may be modified in various respects, and this application is intended to cover any structural departures coming within the scope of the following claims.

We claim:

1. A celery cutting machine comprising a frame including longitudinal bars, transversely arranged forward and rear arch members attached to the bars and extending downwardly beneath the same, wheels mounted on the forward arch member at the bottom thereof, and a horizontally disposed knife mounted on the rear arch member at the bottom thereof.

2. A celery cutting machine comprising a frame including longitudinal bars, transversely arranged forward and rear arch members attached to the bars and extending downwardly beneath the same, wheels mounted on the forward arch member at the bottom thereof, a horizontally disposed knife mounted on the rear arch member at the bottom thereof, and means connected with said longitudinal bars for adjusting the angularity of the knife with reference to the ground.

3. A celery cutting machine comprising a frame including longitudinal bars, transverse forward and rear arch members attached to the bars and extending downwardly beneath the same, wheels mounted on the forward arch member at the bottom thereof, one of said bars being extended forwardly and offset to afford a hitching device at the front of the machine and at one side thereof, a horizontally disposed knife mounted on the rear arch member at the bottom thereof, means connected with the longitudinal bars for adjusting the angularity of said knife with reference to the ground, and a handle at the rear of the machine connected to said longitudinal bars.

In witness whereof, we have hereunto signed our names.

ARTHUR W. THOMPSON.
HOMER W. THOMPSON.